April 3, 1956  J. M. SLATER  2,740,961
STABLE REFERENCE APPARATUS
Filed July 9, 1947  6 Sheets-Sheet 1
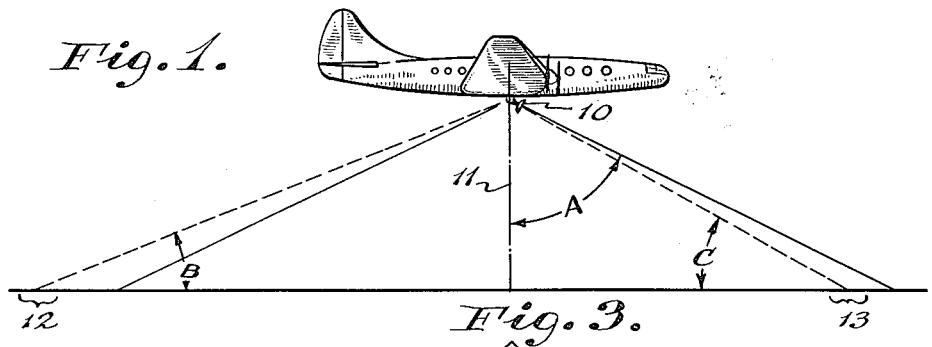
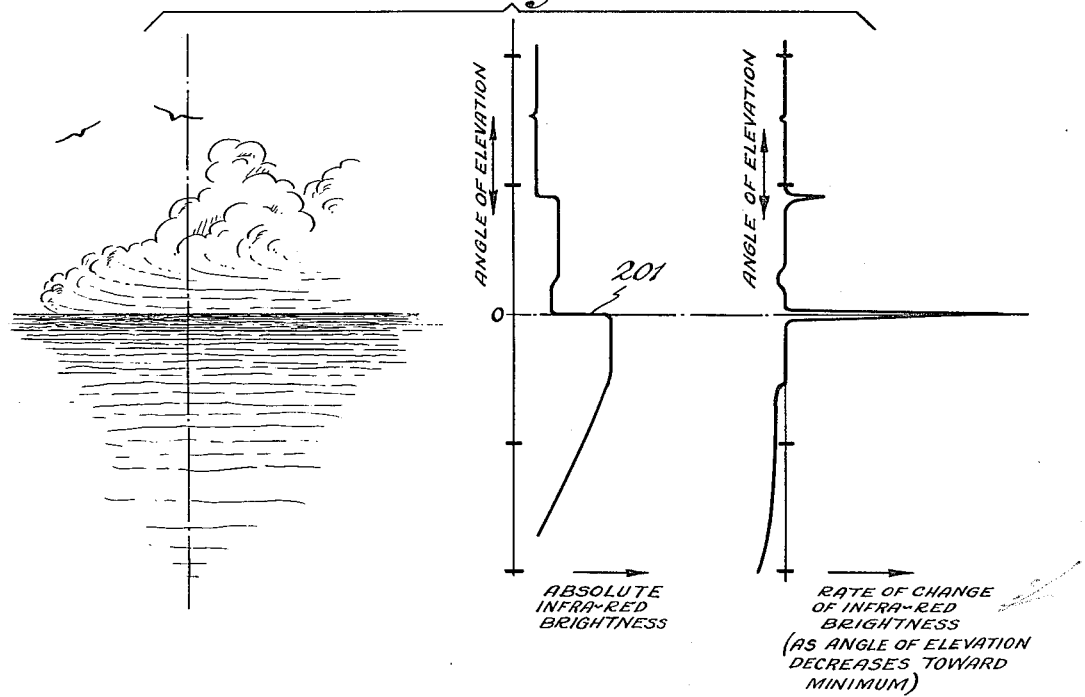
INVENTOR
JOHN M. SLATER
BY
his ATTORNEY

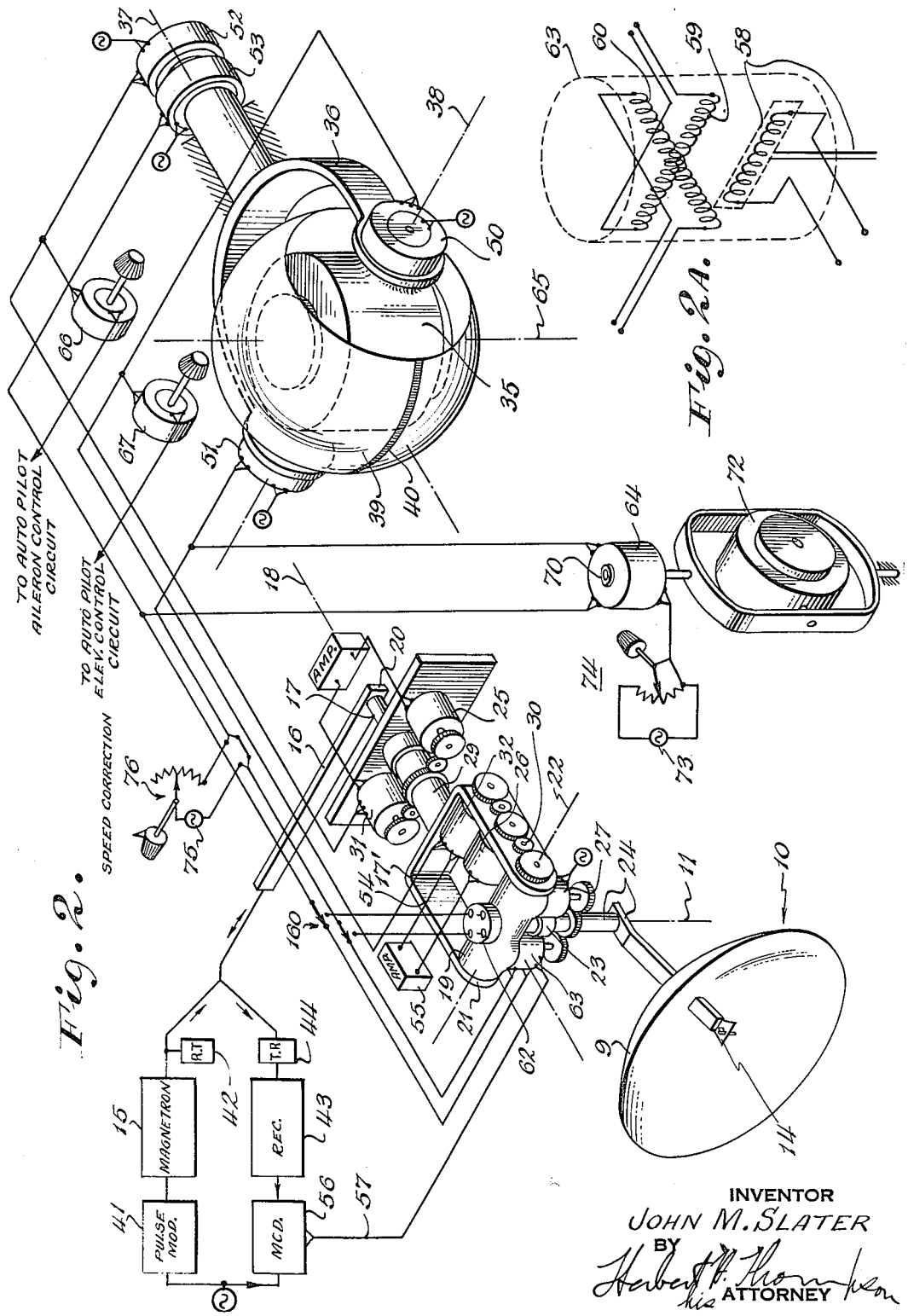

April 3, 1956 J. M. SLATER 2,740,961
STABLE REFERENCE APPARATUS
Filed July 9, 1947 6 Sheets-Sheet 4

INVENTOR
JOHN M. SLATER
BY
Herbert H. Thompson
his ATTORNEY.

April 3, 1956  J. M. SLATER  2,740,961
STABLE REFERENCE APPARATUS
Filed July 9, 1947  6 Sheets-Sheet 5
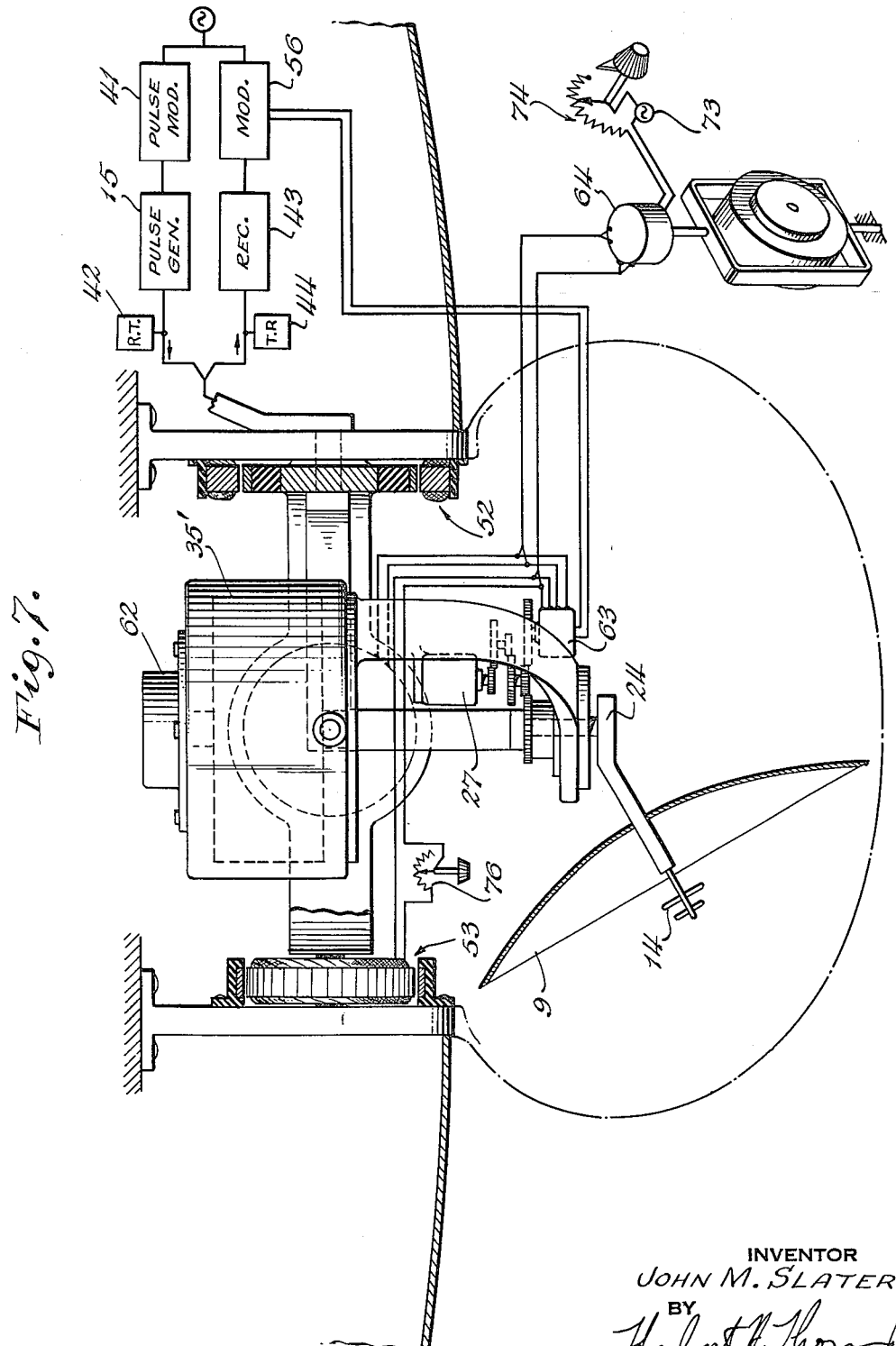
INVENTOR
JOHN M. SLATER
BY
his ATTORNEY April 3, 1956   J. M. SLATER   2,740,961
STABLE REFERENCE APPARATUS
Filed July 9, 1947   6 Sheets-Sheet 6
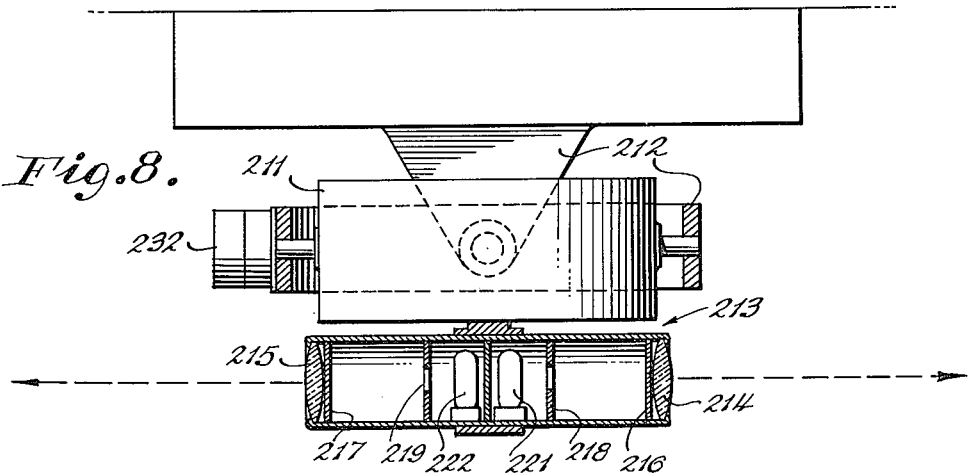
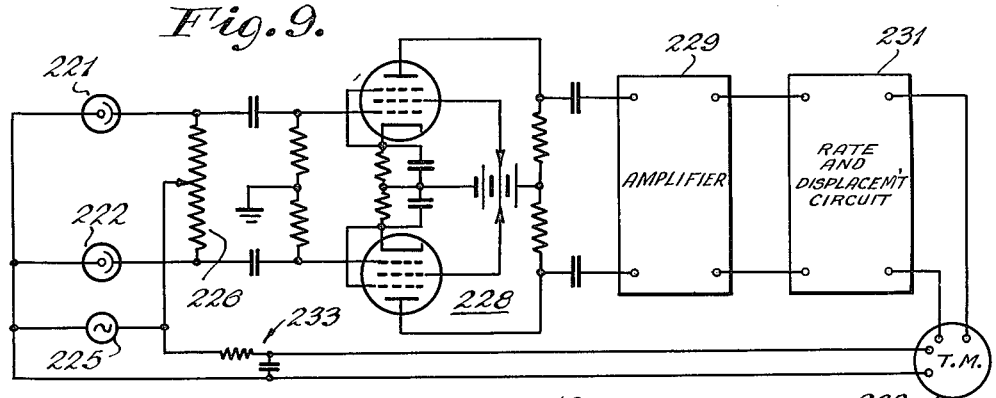
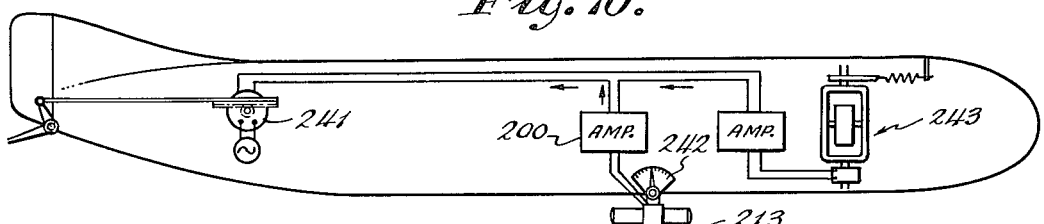
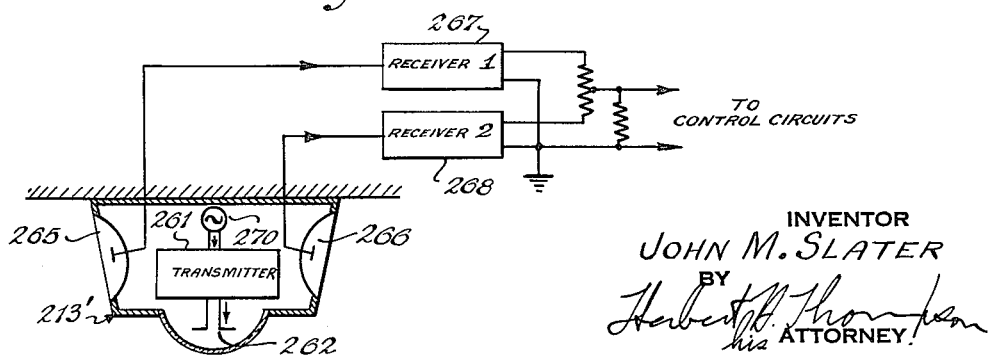
INVENTOR
JOHN M. SLATER
BY
Herbert H. Thompson
his ATTORNEY

United States Patent Office 2,740,961
Patented Apr. 3, 1956

2,740,961

STABLE REFERENCE APPARATUS

John M. Slater, Inglewood, Calif., assignor to Sperry Rand Corporation, a corporation of Delaware Application July 9, 1947, Serial No. 759,808

16 Claims. (Cl. 343—7)

The present invention relates to level indicating appartus for aircraft, guided missiles and ships, which is characterized by the ability to establish a level reference without reliance on gravity.

In aircraft and other dirigible bodies it has been usual to provide vertical references, for indication or control purposes, based on a pendulum, liquid level or other gravitational vertical-seeking device, the device usually being combined with a gyro in order to minimize the effect of transient accelerations. The principle on which gyro verticals and the like are based is that horizontal accelerations (with the exception of the acceleration of Coriolis) average substantially zero, if the average is taken over a long period of time. However, in general horizontal accelerations do not average zero over short periods of time (seconds or minutes) and in any but the most elementary apparatus provision must be made for compensating them more or less exactly. With the high and variable speeds of modern craft, and increasingly stringent requirements as regards precision of the vertical reference, it is becoming more and more difficult to compensate the disturbing accelerations, and in certain guided missiles (rockets, ram-jets, etc.) such compensation becomes practically impossible.

The present invention relates to apparatus for affording a stable level reference which has a precision sufficient for indication or control purposes and which is independent of accelerations, so that it is dependable whatever the velocity of the craft or the kind of maneuver in which the craft is engaged.

An object of the invention is to provide a level indicating apparatus which is independent of direct visual inspection of the earth or the horizon and which nevertheless is insensitive to accelerations.

Another object achieved is the provision of apparatus for establishing a level reference by scanning or otherwise sensing the actual horizon or the earth between the reference point and the horizon, with radiant energy, and obtaining a stable average level indication by control of a gyro in response to the received radiant energy.

Another object achieved is the provision of apparatus wherein an irregular or fluctuating radiant energy direction signal is integrated by means of a gyro to produce a stable and reliable reference corresponding to the average direction signal.

The invention also relates to the novel features or principles of the instrumentalities described herein, whether or not such are used for the stated objects, or in the stated fields or combinations.

The objects are achieved by making use of radiant energy (high frequency electromagnetic energy or infra-red energy for example) arriving from the earth or sea at or near the horizon. The ocean itself constitutes the gravity reference, in the invention as used in ships and on aircraft en route along a transoceanic path. On land, the fact is made use of that whatever may be the local irregularities, land averages very nearly level or flat, if the average is taken over a long period and over an extensive expanse. Short-period disturbing effects taking place either on sea or on land are smoothed out and rendered negligible by integrating means, which in the best embodiment of the invention are of a kind which itself tends to maintain a fixed direction with respect to the earth or space; these integration means usually, though not necessarily, taking the form of a gyro of three degrees of freedom. Thus, the horizon or terrain-level indications of the scanning device, which may be rough due to various causes, are applied through a control system to a gyro in a manner to urge the gyro toward coincidence with the level indications; the gyro is arranged to conform to any persistent or long-continued level indication signal but to be little affected by short-period changes in signal, so that the gyro furnishes a quite stable reference. The gyro so combined with the level reference device acts as much more than a mere smoother or averager; as will appear it makes possible satisfactory functioning of the level indicating reference under conditions so disturbing or otherwise unfavorable as to preclude obtaining an indication of level in the absence of the gyro.

In one form of the invention the radiant energy is generated on the craft, and is propagated therefrom toward the earth by a scanner and is received after reflection. When the scanner is level the energy received back from the earth is, on the average, the same whatever the orientation of the scanner in azimuth, but when the scanner is off level the received energy differs depending on the orientation of the scanner. This difference is detected as a measure of the off-levelness of the scanner and is utilized, through the agency of the gyro, to restore the level condition.

In another form natural radiant energy is utilized. For example infra-red radiation exists from both earth and sky but generally there is a marked difference in the infra-red "brightness" of earth and sky, so that by detecting the point at which the sharp change in brightness occurs the horizon is detected. Accordingly there is provided one or more cameras arranged to scan vertically widely spaced parts of the horizon and to detect the brightness change, or rate of change, thereat. The camera system is stabilized level through the gyro in a manner similar to the arrangement described above.

The level reference apparatus of the invention has several marked advantages over previously known equipment. Since the ultimate level reference—the surface of a vast body of water, or a wide expanse of land—is outside the craft rather than being carried with it, maneuvers of the craft have no effect on the accuracy of the reference. Furthermore, due to the excellent spatial integration characteristics of the gyro, the level reference is affected only to a negligible extent by short-lived fluctuations of the received radiant energy—fluctuations such as may occur due to the presence of mountains and valleys on land. Moreover the gyro integrates effectively the directional signals even when they are so weak or erratic that they could not otherwise be interpreted as indications of level. Thus what is achieved is the provision of a stable gyro, which remains accurately level and which is available for both manual and automatic control of craft or stabilization of guns, sextants and other objects on the craft that require stabilization.

In the accompanying drawings there are shown examples of specific embodiments of apparatus within the scope of the invention. In the drawings, Fig. 1 is a diagrammatic view of an aircraft in flight equipped with one form of apparatus according to the invention, to illustrate the principle of operation; this form making use of a microwave scanner;

Fig. 2 is a schematic view of the apparatus employed in the system of Fig. 1, showing the scanner and gyro assemblies, and Fig. 2–A shows the schematic arrangement of resolver units in Fig. 2.

Fig. 3 shows diagrams applying to a second form of the invention, in which the actual horizon is scanned for infra-red energy;

Fig. 7 is a view of a modification of the structure shown in Fig. 2;

Fig. 8 is a schematic view of an embodiment of the invention free from the requirement of relative movement of the energy receiving means;

Fig. 9 is a circuit diagram corresponding to the structure shown in Fig. 8;

Fig. 10 is an illustration of a direct application of the orientation sensing device of Fig. 8 to an aircraft; and Fig. 11 is a schematic illustration of a radio energy system corresponding generally in principle to the arrangement illustrated in Fig. 8.

Figure 4:
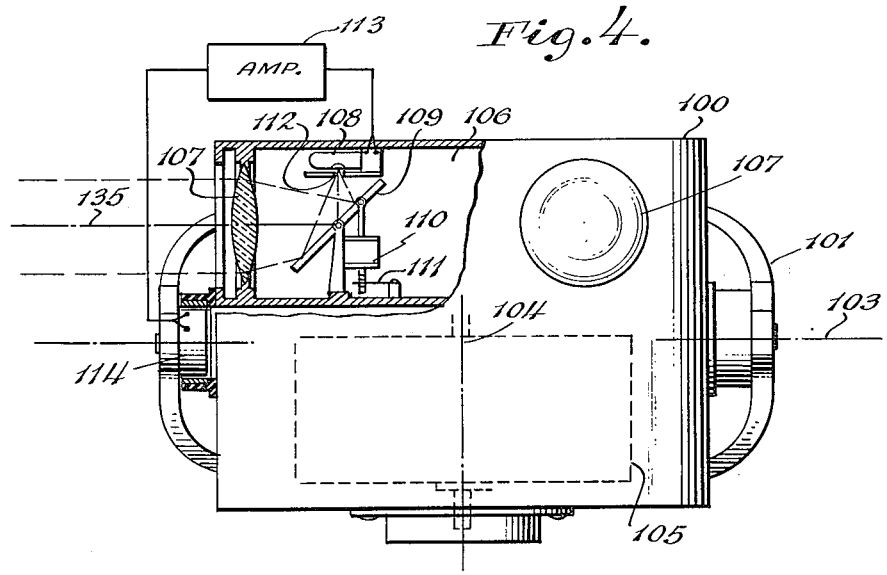
Fig. 4 is a view in elevation, with some parts in section, of an infra-red scanning camera used in the second form of the invention.

Referring to the drawings and more particularly to Figs. 1 and 2, the principles of operation of one form of the invention are illustrated in Fig. 1. An aircraft is provided with an electromagnetic energy scanner 10, directed toward the earth at a rather large angle A, and rotated about a normally vertical axis 11, so that the directivity axis is scanned through a cone of vertex angle 2A. The scanner is arranged to send and to receive energy. When axis 11 is vertical, and the earth's surface in the vicinity is reasonably level, the amount of energy received by the scanner is constant during the revolution of the scanner; but if the scanner cone axis 11 tilts forward for example, then, as indicated by the dash lines, the angle of incidence forward is made greater than that to rearward, and the forward propagation path is shorter than that to rearward. Accordingly, the amount of received energy oscillates, during rotation of the scanner, at the period of rotation of the scanner, the maximum energy return being coincident with the passage of the scanner through the angular position corresponding to the steepest direction of aiming, e. g., the forward direction in the example of Fig. 1. This condition is detected and utilized, through extended influence upon the associated gyroscopic means described below, to level the scanner.

There are two additive reasons for the difference in received energy on the low and high sides (regions 12 and 13). One is that the energy from the scanner has farther to go, and farther to come back, at the angular position of the highest aiming than at the angular position of the lowest or steepest aiming of the directive antenna. Since the amount of energy received varies inversely as the fourth power of the distance between the scanner and the effective reflecting area, a very slight departure from vertical of the conical scanning path results in an appreciable change in received energy, as a result of the distance variations. The other contributing factor is that the energy at the higher aiming strikes the earth at a smaller angle of incidence (angle B) than on the low side (angle C), so that less energy is reflected. These two effects—change of distance and of angle of incidence—both make for a very great decrease in received energy with higher aiming and increase with lower aiming. In general the larger the cone angle 2A can be made, the more sensitive is the apparatus.

Fig. 2 shows the complete apparatus system. The scanner 10 conveniently takes the form of a paraboloid 9 with an energy radiating element 14. Uultra-high-frequency energy is supplied to the scanner from a conventional source 15 such as a magnetron tube, through wave guides with movable joints arranged in the manner of gimbal joints, so that the scanner is free not only to rotate but also to tilt relative to the aircraft. A stationary wave guide 16 fixed with respect to the aircraft is electrically and mechically connected to wave guide parts 17, 17' through a rotating joint 20 whereby parts 17, 17' are free to tilt about an axis 18, which may conveniently be arranged to be the longitudinal (roll) axis of the craft. Parts 17, 17' thus constitute in effect the outer member of a gimbal or Cardan mount. The inner member includes a section of wave guide 19 which is similarly pivoted to parts 17, 17' by a second rotation-permitting joint 21. Thus member 19 is free to tilt, with respect to the aircraft, about both the roll axis 18 and the pitch axis 22. Member 19 carries, through a rotating joint 23, a section of wave guide 24 on which is mounted the scanner and the radiating element. The scanner and its associated parts are free for unlimited rotation in azimuth, about axis 11, and for angular movements in roll and pitch such as to accommodate usual maneuvers of the craft. The scanner is movable about its three free axes by means of motors 25, 26 and 27 operating on gears at the rotation-permitting joints. The roll and pitch motors 25 and 26, respectively, are also arranged through gearings 29 and 30 respectively to drive synchros 31 and 32 respectively, in synchronism with the gimbal movements. These synchros can be of the well-known selsyn or other types, having a three-phase wound stator and a single phase wound rotor, and their purpose is to compare the relative orientations of the scanner and the gyro, as will be explained.

A gyro 35 is provided, mounted neutrally (non-pendulously) in a gimbal ring 36 the two axes 37 and 38 of which are advantageously arranged parallel to axes 18 and 22 respectively. The gyro is conveniently made without stops or limits, as shown, so that it will always be available for reference even though the maneuvers of the aircraft exceed the angular movements allowed by the scanner mounting. The gyro is provided with a spherical case 39 marked with a horizon line 40 so that the pilot can determine the relation of the aircraft to level by looking at the case. The gyro has a synchro 50 and torque motor or torquer 51 on the gimbal pitch axis and a similar synchro 52 and torquer 53 on the roll axis.

The ultra high frequency circuit comprises a magnetron 15 which is caused to emit pulses of ultra high frequency energy by means of a pulse modulator 41. The pulse rate is conveniently made the frequency of the aircraft's alternating current supply, which is nominally 400 cycles at present, though a wide range of frequencies is satisfactory for the purpose. The pulsed ultra high frequency energy goes past an RT box 42 of known type—the purpose of which is to prevent waste of received energy in the magnetron—and to wave guide 16, whence it passes to the radiating element 14 and is propagated by the scanner as a narrow beam. A small part of the energy is reflected back to the scanner from the earth and is turned through the wave guide system to a receiver 43, a TR box 44 being interposed to protect the receiver from the energy being transmitted from the magnetron. The receiver produces an output signal of strength corresponding to the strength of the received microwave energy. This signal is constant when the scanner is rotating about a vertical axis, but varies when the scanner is tilted, as described in connection with Fig. 1.

The stators of the pitch axis synchros 32, 50 are interconnected, and the gyro synchro 50 is excited with constant alternating voltage. Therefore, synchro 32 yields a signal when either of elements 35, 19 tilts relative to the other. This signal appears at rotor leads 54 of synchro 32 and is amplified at 55 and applied to pitch axis motor 26 in a sense to move the scanner mount until member 19 is again in predetermined angular relation with the gyro. The roll axis gyro synchro 52 and scanner synchro 31 and motor 25 operate in an exactly similar way to maintain the scanner mount levelled with respect to the gyro about the roll axis. Thus the scanner mount is constrained to remain in fixed orientation relation to the gyro.

The gyro in turn is controlled from the output of the ultra high frequency receiver 43. This output is a variable level unidirectional signal and while it could be used directly, it is more convenient to convert to an alternating signal, as by modulation. This is done with the aid of a modulator 56 supplied from the aircraft A. C. supply, so that its output at 57 is a 400-cycle A. C. signal modulated by the receiver output signal.

Since the gyro torquers do not rotate in azimuth with the scanner, it is convenient to include a rotary transforming device 63 so that the control signal will always be applied about the two gimbal axes in the proper ratio. The transforming device 63 as illustrated in Fig. 2-A is of a well-known kind including a rotor 58 to which is applied the signal from the modulator 56, and two stationary windings 59, 60 which are 90 degrees apart in azimuth. These windings are connected to torquers 53, 51 as shown. The rotor is geared to the scanner and turned in synchronism therewith. In the instantaneous orientation of the apparatus shown in Fig. 2, corresponding fully with Fig. 1, all the signal supplied to rotor 58 by modulator 56 goes to winding 59 since these coils are instantaneously parallel, and through this winding 59 to the roll axis torquer 53. When the scanner has moved 90 degrees in azimuth all the signal goes to winding 60, and at intermediate positions the signal is divided between these windings.

Considering the operation of the apparatus, pulses of ultra high frequency energy are transmitted and received as described. If the scanner axis 11 and the gyro spin axis 65 are both vertical nothing occurs to disturb this condition. The constant signal then appearing at 57 results in a torque being applied to the gyro about an effective axis determined by the instantaneous orientation of the scanner, which torque theoretically results in a slight conical movement of the gyro spin axis, but due to the rapid rotation of the scanner this movement of the gyro spin axis is quite negligible.

If the aircraft changes attitude—climbs for example— the gyro spin axis 65 remains vertical due to gyroscopic stability, and the scanner being controlled according to the gyro as described above, also remains vertical.

If the gyro drifts from vertical, due to earth rotation effect (see below) or other causes, the scanner axis 11 is made to move correspondingly from vertical. But on occurrence of such tilt the receiver signal varies cyclically in the manner described, and a corrective torque is applied to the gyro. Thus if the gyro tilts forward and the scanner is thus similarly tilted forward (cf. Fig. 1) there will be less signal at 58, in the orientation shown in Fig. 2, than when the scanner is 180 degrees away from this orientation. Accordingly the gyro is subjected periodically to alternate strong and weak torques oppositely directed about axis 37, thereby causing precession of the gyro about axis 38 toward vertical. Windings 59 and 60 are connected to their torquers in such polarity—with relation to the direction of spin of the gyro—that the torques are restoring torques as described.

In using the level reference apparatus for control purposes, for example for controlling the ailerons and elevator of an aircraft, a pair of synchros 66, 67 can be connected into the roll and pitch synchro circuits, respectively. The synchro rotor outputs go to aileron and elevator servomotor systems (not shown) and by manual adjustment of the synchro rotors the aircraft can be stabilized at a predetermined bank angle or angle of climb or glide.

Considering the practical requirements of the apparatus: it is desirable to employ a very high frequency for the radiation transmitted toward the earth, in order to obtain a sharp beam with a scanner reflector of reasonable size. Using a reflector two feet in diameter, and radiation of wavelength 3 cm., a 3-degree beam can be obtained, i. e., a beam wherein the energy level falls to one-half maximum amplitude 1.5 degrees away from the axis. A 3-degree beam can be obtained using only an 8-inch reflector, if the wavelength is reduced to 1 cm., but use of this very short wave radiation is undesirable in some cases because the transmission is interfered with to some extent by atmospheric moisture.

The cone vertex angle 2A (Fig. 1) is made as large as possible consistent with obtaining reflected energy in sufficient intensity for proper operation. An angle 2A of 120 degrees to nearly 180 degrees is convenient. With an angle of 150 degrees, a tilt of one degree changes the received energy by approximate alternate variations of plus and minus 25 percent.

The scanner rotation speed is conveniently made of the order of one revolution per second.

The maximum rate of erection of the gyro should be kept to a low value such as 2 or 3 degrees per minute.

A significant advantage of the present apparatus is that it can function under very unfavorable conditions of signal-noise ratio. This is due to the excellent integrating characteristics of the gyro. The signal from the ultra high frequency receiver can be very irregular, as due to poor reception conditions, and yet the gyro will integrate the irregularities and assume an accurate average position.

While the apparatus as described is completely insensitive to accelerations, the gyro, like any other, is responsive to the earth's rotation and to the speed of the craft over the (round) earth. A convenient apparatus for correcting for the earth's rotation effect is included in Fig. 2. An additional rotary transformer or component resolver unit 64 having a wound rotor 70 is coupled to a gyromagnetic compass 72 or other azimuth reference, for rotor stabilization in azimuth. The rotor winding is energized from a source 73 to an adjustable extent depending on the craft latitude, the adjustment being made by means of a calibrated rheostat 74. The rotor of this resolver is maintained in such orientation that a constant torque component is applied to the gyro, about the north-south axis in the sense to produce easterly precession about the effective east-west axis, sufficient to cause the gyro to precess at the earth's rotation rate and thereby to stand still relative to the earth. This torque in general will be applied by both torquers together, the relative contributions of the two being determined by resolver 64 according to the heading of the craft and the consequent orientation of axes 37 and 38 relative to the east-west horizontal axis.

Correction for craft speed is conveniently made by introducing a signal to the roll axis torquer 53, by means of a source 75 and rheostat 76, the latter being calibrated for adjustment according to the normal speed of the craft.

It is convenient in some cases to employ radiant energy of natural origin for vertical or level reference. Infra-red radiation from the earth, water and sky in general exhibits a discontinuity at the horizon. According to the invention, this discontinuity can be detected, by suitable scanning devices which scan in two normally-vertical mutually perpendicular planes, and a gyro can be controlled in accordance therewith—the gyro in turn being arranged to stabilize the scanning means. When the apparatus is level the discontinuity in received energy takes place very nearly at the midpoint of the scan, but when the apparatus is not level the discontinuity occurs at other than the midpoint. An appropriate circuit is provided to cause precession of the gyro in a sense to restore the level condition.

Advantageously, in this embodiment of the invention the signals corresponding to the infra-red discontinuity are differentiated, so that the apparatus in effect responds to the greatest rate of change in received energy. The reason for differentiating is that ordinarily the boundary between sky and earth will be sharper, that is more marked and abrupt, than boundaries between other infra-red sources in the lanscape, even though the absolute difference between the values of infra-red brightness on the two sides of the boundary may be less than elsewhere. For example at sea in some weather the sea and the sky may have infra-red brightnesses that are more nearly the same than the brightnesses of the sea and a cloud for example. Nevertheless the abruptness of the change is greater in the case of the sea-sky boundary than in the case of the sky-cloud boundary, and this distinction can be made use of by employing rate-of-change responsiveness rather than direct comparison of magnitudes.

The character of the received infra-red energy signal obtained with the apparatus to be described, is indicated in Fig. 3, for an idealized case. It will be appreciated that the particular shape of the signals may vary greatly with different terrains and atmospheric conditions, but on the average the sharpest rate of change of signal will be at the horizon.

Figure 5:
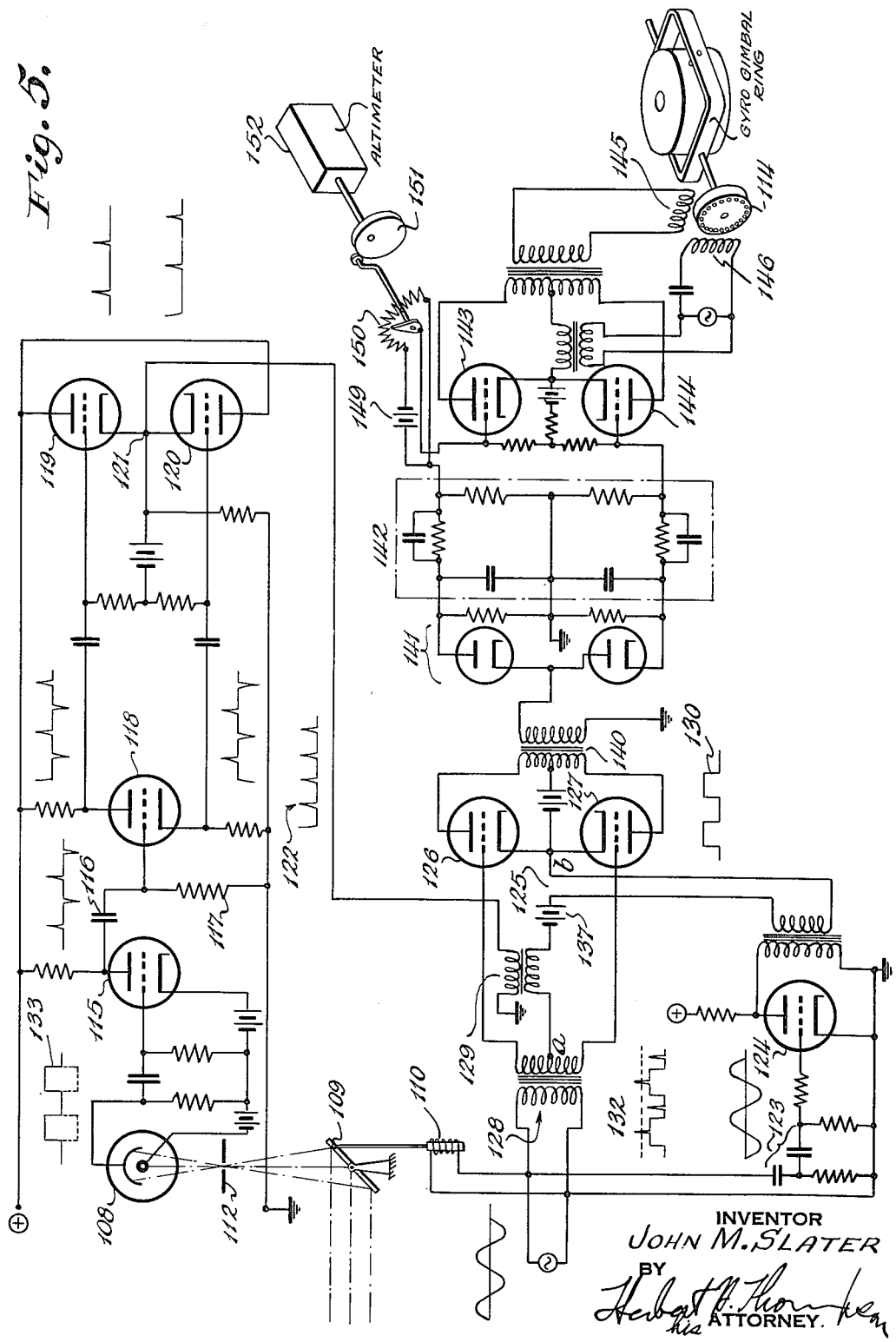
Fig. 5 is a diagram of the electrical circuit employed with the camera of Fig. 4.

Fig. 4 shows a form of apparatus making use of infra-red radiation. A housing 100 is provided, pivotally supported in a gimbal member 101 for universal movement with respect to the craft (not shown) about two axes, at right angles, one axis being shown at 103 and the other being at right angles to the plane of the drawing through point 104. The apparatus is conveniently mounted in the nose of an aircraft, or on the mast of a ship, with axis 103 parallel to the transverse (pitch) axis. The housing 100 contains a gyro 105 and a camera space 106 containing two identical infra-red scanners directed parallel to the two axes. Each scanner includes a lens 107, of suitable material transparent to infra-red, a photoelectric cell 108 and a mirror 109 arranged to be oscillated by a solenoid 110 centered by a spring 111. A pin-hole or narrow slit aperture 112 is provided in an opaque diaphragm at the focal plane of the lens. When the solenoid is energized with alternating current the horizon is scanned in a vertical plane. Approximately in the middle of the oscillation, the photoelectric cell detects the change in infra-red brightness at the horizon, as indicated at 201 in Fig. 3. A suitable amplifier 113, described in detail in connection with Fig. 5, is arranged to energize torquer 114 in a sense to move the gyro and hence the camera toward the position where the maximum rate of change of discontinuity occurs at the middle of the scan. Thus the apparatus is stabilized with respect to the horizon (horizon dip being compensated as described below).

Fig. 5 shows the circuit connecting the roll-axis scanner and the pitch-axis torquer (the circuit for the pitch-axis scanner and roll-axis torquer is identical). The output signal from photoelectric cell 108 is a wave of fundamental frequency the same as that of the scanning frequency, which is determined by the frequency of the energy supplied to solenoid 110 and may conveniently be 60 cycles a second. The signal will in general exhibit an abrupt change, as at 201 (Fig. 3) when the horizon line direction is crossed. For clarity of illustration the form of the photoelectric cell output signal wave is sketched in Fig. 5 at 133 for the ideal case of a large abrupt change at the horizon and no change elsewhere in the field of scan. As illustrated in dotted lines, under some conditions the relative infra-red brightnesses of sky and earth may be reversed. The wave 133 is amplified in stage 115 and the amplified wave is differentiated by means of capacitance 116 and resistance 117, so that a series of alternate positive and negative "spikes" are provided at the grid of tube 118, a phase inverter stage. The output of stage 118 goes to a pair of cathode followers 119, 120 biased just to the point of plate current cutoff by a grid bias source, the function of which is to insure that the negative spikes are removed. The combined output of the cathode followers at junction 121 is a series of spikes, all of the same polarity. The polarity is the same whether the sky signal is greater than, or less than, the earth signal.

Figure 6:
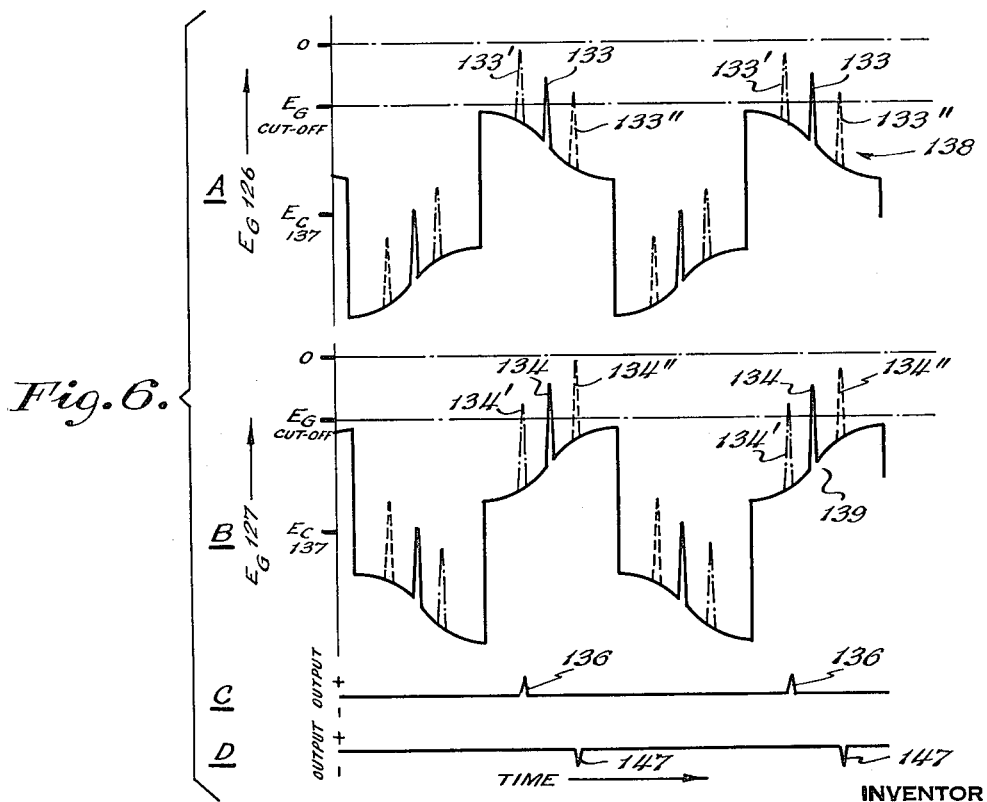
Fig. 6 is a diagram graphically indicating the natures of certain signals that occur in the circuit of Fig. 5.

Phase comparisons are made between selected pulses of the pulse series 122, e. g. alternate pulses resulting during the downward scanning movements, and the scanning motion reference phase, to produce a phase detector output voltage varying with tilt of the axis of gyro 105 (Fig. 4). A gate-forming circuit including a phase shifting circuit 123 and a tube 124 is employed to provide a square wave 130 of phase shifted 90 degrees from the source frequency. The gate wave 130 is applied at 125 to a balanced modulator comprising two tubes 126, 127 in push-pull arrangement, supplied at 128 with oppositely phased sinusoidal voltage components of the reference frequency and at 129 with the spike series 122. A grid bias battery 137 is connected in the common grid circuits of tubes 126 and 127, and the negative bias provided at the grids of tubes 126 and 127 by battery 137 exceeds the bias required to prevent anode current in tubes 126 and 127 by an amount greater than the sum of the amplitudes of wave 130 and the sinusoidal voltage supplied between the center tap and one end of the secondary of transformer 128. Therefore, anode current through tubes 126 and 127 is prevented at all times except when alternating ones of the spikes of wave 122 coincide with the positive half-waves of the square wave 130. The input to the modulator between points $a$ and $b$ is as sketched at 132. The overall voltage applied between grid and cathode of tube 126 is illustrated in Fig. 6–A, while that resulting between the grid and the cathode of tube 127 is illustrated in Fig. 6–B. These waves at A and B in Fig. 6 include the spikes at equal intervals, the spikes occurring at the mid points of the half-waves of sinusoidal voltage from transformer 128 and similarly halfway between the vertical wave portions corresponding to the vertical parts of wave 130. These solid line spikes illustrate the operation when the axis of gyroscope 105 (Fig. 4) is vertical, so that the horizon is traversed at the middle of each sweep of mirror 109. Under these conditions, spikes 133 and spikes 134 have equal vertical extensions, causing equal momentary current impulses to flow simultaneously through tubes 126 and 127, with zero resultant output.

The graphs of grid-cathode voltage in Figs. 6–A and 6–B show the addition of the square-wave and recurrent pulse voltage components of graph 132 to the sinusoidal voltage components introduced between point A and the respective grids of tubes 126 and 127. Because of the high negative bias on tubes 126 and 127, as represented in Figs. 6–A and 6–B, only those spikes on the upper parts of the square wave component are effective to render the tubes momentarily conductive. If these spikes 133 occur midway between the positive minimum and the negative minimum of the sinusoidal voltage component, then the positive spikes 133 in Fig. 6–A provide conduction pulses in tube 126 equal to those provided by spikes 134 in Fig. 6–B. This condition corresponds to traversal of the horizon direction midway in the strokes of the oscillatory mirror 109, and hence to a vertical alignment of the rotor 105 (Fig. 4). When the spikes of wave 122 are not uniformly spaced, as when the mid-swing axis 135 in Fig. 4 is tilted downward, the spikes of wave 122 corresponding to the traversal of the horizon direction in the downward scan are advanced, as illustrated at 133′, and spikes 133′ are elevated by addition of the finite positive instantaneous voltage in the sinusoidal component of wave 138, while the advanced spikes 134′ in wave 139 (Fig. 6–B) are added to a negative instantaneous voltage value in the sinusoidal voltage component. Consequently, quite large current pulses are produced through tube 126 by the advanced (and elevated) spike 133′, while decreased current pulses through tube 127 result from lowered spikes 134′. Therefore, a series of net positive pulses 136 are produced in the output transformer 140, as illustrated in Fig. 6–C. On the other hand, if the axis 135 is tilted upward, so that transversals of the horizon occur later during the downward strokes and earlier during the upward strokes of the scanning mirror 109, the selected spikes in the downward stroke will be retarded as shown at 133″ and 134″, and the net output wave comprises reversed-polarity pulses 147 as shown at Fig. 6–D.

The output wave thus supplied through transformer 140 is applied to a pair of series-connected rectifiers 141, and the output circuits of these rectifiers are connected to a rate responsive circuit 142 and supply signals therethrough to a balanced modulator 143, 144 arranged to supply reversible phase alternating current to a control winding 145 of the gyroscope torque motor 114. The connections of the rectifier system 141, the rate circuit 142, the balanced modulator 143, 144 and the torque motor 114 are such as to apply a precession-producing torque to the gyroscope about the pitch axis, tending to produce the corrective precession in roll and hence to restore the midswing axis 135 to a level orientation and accordingly, to restore the axis of gyro 105 to a vertical alignment.

Because of the curvature of the earth the horizon lies below a tangent level plane, making a dip angle D which is given by the expression $$\cos D = \frac{R}{R+h}$$

where R is the radius of the earth and $h$ is the height of the scanning apparatus above the earth. For example at an altitude of ten miles the horizon is about 1.2 degrees below the tangent level plane. Dip can be automatically compensated by employing two pairs of scanners, each pair being arranged to scan the horizon simultaneously in diametrically opposite directions, or it can be compensated in the apparatus of Fig. 5 by introducing a bias, as by means of a potentiometer 150 which is adjusted by a cam 151 from an altimeter 152; the cam being so shaped that the bias is varied in accordance with the foregoing relation. Adjustment for refraction error can also be made at rheostat 150.

Fig. 7 shows an arrangement of a stabilization system based upon transmission and reception of ultra high frequency energy generally in the manner illustrated in Fig. 2, but with reorganization of the elements into a relatively compact and somewhat simplified structural system. The arrangement in Fig. 7 is somewhat limiting as to the location of the gyroscope, but for many purposes, e. g., for autopilot work, this is not a disadvantage. As illustrated in Fig. 7, the antenna arrangement 9, 14 and scanning spinner motor 27 are attached to gyroscope rotor housing 35', so that a common Cardan suspension system serves the dual role of universally supporting the gyroscope and universally supporting the antenna system. Furthermore, a servo control system is eliminated in view of the direct connection of the scanning system and the gyroscope system. Moreover, as will be apparent, no change can take place in the relative orientations of the scanning axis and the gyroscope rotor axis—these will always remain aligned. It will be readily apparent, also, that the spinning motor 27 may be dispensed with and a gear reduction drive may be provided from the gyroscope rotor drive motor, if preferred.

It will be readily apparent that the present invention is susceptible to wide variations according to the conditions prevailing for a given field of craft operation and according to the space available and the allowable carrying capacity of the craft. While the radio transmitting and receiving systems of Figs. 2 and 7 both provide for continuous rotation of an inclined scan in contradistinction to the vertical-plane oscillation illustrated for the infra-red signals, it will be readily apparent that the radio antennas could be vertically oscillated, and that two or more such antennas readily can be employed in a single installation. Furthermore, as will be apparent, liquid level switches or other pendulous gravity-reference controls, such as a liquid-level switch 62 (Figs. 2 and 7) of the kind shown in Muma et al. 2,376,377, for example, may be arranged for operation alternatively or in conjunction with the radiant energy scanning schemes outlined above, as for example, for temporary employment during passage over an extensive mountainous range. Thus, by moving switch 160 (Fig. 2) down, control of the gyro is transferred from the scanner to the liquid level.

The foregoing embodiments of the invention are illustrated as requiring relative movement, e. g. oscillation or rotation, of the directional energy receiving systems to provide modulation corresponding to inclination. Such modulation is not indispensable in the present invention, as is illustrated by reference to Figs. 8–11.

In Fig. 8 there is shown an arrangement of an infra-red energy receiving arrangement adapted to retain a gyroscope erected with respect to one of the gimbal axes, e. g., with respect to the longitudinal or roll axis of the craft. The gyro rotor case 211 is seen in the elevation view in Fig. 8 as from the stern of the craft looking directly forward. This rotor case 211 is suspended by a suspension system indicated generally at 212 for freedom about the roll and pitch axes of the craft. An infra-red energy receiving system 213 is attached to the bottom of the gyro rotor case 211. This infra-red receiving system 213 includes right and left lenses 214 and 215, right and left infra-red filters 216 and 217, diaphragms 218 and 219, and right and left photoelectric cells 221 and 222. Each lens and photocell and diaphragm system is so situated and arranged that the photo-electric cell cathode is illuminated by infra-red energy coming from an appreciable range of angles, e. g., from a range of +3° to −12°, as specified in terms of angles of elevation.

The photoelectric cells 221 and 222 are connected as shown in Fig. 9 to an energy source 225, which is illustrated as an alternating voltage source, so that alternating voltage amplifiers may be used for high gain with great stability. Source 225 supplies the respective photoelectric cells through opposite branches of a potentiometer 226, the arm of this potentiometer being adjustable for zero voltage difference produced between the potentiometer end terminals when the gyroscope spin axis is vertical. The end terminals of the potentiometer 226 are connected to the input circuit of a balanced amplifier, which may include a high gain push-pull pentode amplifier stage 228. Several further amplifier stages may be provided, as indicated schematically by unit 229. This amplifier system may deliver its reversible phase alternating voltage output directly or through a derivative circuit 231 to the controllable voltage winding of a motor 232 arranged to have its reference voltage winding supplied by the generator 225 through a phase adjuster circuit 233. The motor 232 may be arranged at one of the athwartship axis gimbal journals of the gyroscope, as shown in Fig. 8, for applying torque about the athwartship axis to produce precession of the gyroscope in the direction to overcome inclination error indicated by an alternating signal passing through the amplifier system 228 and 229.

When the gyro spin axis is vertical, each of the photoelectric cells 221 and 222 is partially illuminated by infra-red energy arriving through the associated lens and infra-red filter system. A substantially focussed infra-red energy pattern is produced upon the photoelectric cathode, the upper part of the cathode ordinarily being provided with relatively intense infra-red energy arriving from the earth's surface, i. e., from direction below the horizon, and the lower part of the photoelectric cathode being less intensely illuminated in view of the lower intensity of infra-red energy arriving from the sky under ordinary conditions, and particularly when the apparatus is operated at very high altitudes. Under these conditions, each of the photoelectric cells 221 and 222 is operative to provide an alternating output voltage, the output voltages being cophasal, and each being less than the maximum output voltage of which the cell is capable.

When the spin axis of the gyro vertical 211 is vertical the adjustable arm of the potentiometer 226 is set for zero voltage difference between the grids of the tubes in the amplifier stage 228. If the gyroscope rotor axis becomes slightly inclined about the roll axis, e. g., with the top of the gyro rotor case inclined to the left, the lowermost energy receiving portion of unit 213, which in this case would be the left-hand photoelectric receiving system 215, 217, 219, 222, is effective to receive more infra-red energy than that actuating the cathode of the uppermost photoelectric cell, i. e., cell 221. Under these circumstances, a larger alternating voltage is produced across the lower branch of potentiometer 226 than across the upper branch, and accordingly, an alternating output voltage is produced by the amplifier system in the phase corresponding to predominance of the signal from cell 222. The torque motor 232 is so connected to units 225 and 231, and so arranged in relation to the gimbal suspension of the gyro rotor case, that it applies a torque to the gyroscope in the direction to cause precession back to the vertical.

Where very accurate stabilized reference is desired and particularly where radiant energy reception is likely to be interrupted for short intervals of time, the radiant energy directional reference system is applied directly to a gyroscope or other orientation-maintaining element. For some applications, however, the inclination-indicating signals produced by a system such as that shown in Figs. 8 and 9 may be applied directly to a steerable craft which in turn may incorporate gyroscopes or other instruments for stabilization or for aid in navigation. A unit of the type indicated generally at 213 in Fig. 8, is shown in Fig. 10 attached directly to an aircraft. With such an attachment the output signals from the amplifier system 200 (corresponding to the group of units 228, 229, 231, in Fig. 10) may be applied to an elevator control motor 241, for correction of the craft attitude upon departure thereof from a predetermined pitch on scale 242 for which unit 213 is locked to the craft. The signals from the amplifier 200 may be applied directly to the elevator servomotor 241, or may be supplemented by signals from a rate of turn gyroscope 243 arranged to respond according to the angular velocity of the craft about it athwartship axis. The latter arrangement aids in obtaining smooth responsiveness of the craft to the signals produced by unit 213.

Furthermore, as illustrated schematically in Fig. 11, regular movement such as oscillation or rotation is not required where a radio energy reflection system is employed for the vertical reference signals. The high frequency radio energy source 261 may be connected to a transmitting antenna 262 of the type providing very wide-range angular coverage, or it may be connected to an antenna system providing directive transmission both to the right and to the left at relatively small angles of inclination downward, which correspond to the inclinations of the receiving antennas 265 and 266. The receiving antennas are connected to receivers 267 and 268, respectively and the output circuits of these receivers, in opposition, are connected directly or through further amplifier circuits to a control circuit such as a control winding of a torque motor. If a reversible phase alternating output voltage is desired, the transmitter or ultra high frequency energy source 261 may be energized by an alternating voltage power supply 270 which also may be connected to supply a reference winding of an alternating voltage torque motor or servo motor controlled by the net output signal from receivers 267 and 268.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. A level reference comprising a device having the property of resisting angular movement in inert space but capable of such movement upon application of a control moment thereto, means receiving radiant energy from the earth's surface from at or near the horizon for producing a signal varying with tilt of said means relative to the horizon, means coupling said radiant energy receiving means to said device for tilting said receiving means according to angular movement of the device, and means under control of said signal for applying a moment to said device in the sense to reduce the tilt.

2. Stable reference apparatus comprising universally suspended means for maintaining a predetermined orientation in space, and supervisory control means coupled to said orientation maintaining means for exerting correcting influences thereon for gradual change of the orientation thereof with respect to the earth, said supervisory control means comprising directionally selective radiant energy responsive means controlled in position by the position of said orientation maintaining means for receiving radiant energy arriving from the earth's surface, and means responsive to a signal output of said directionally selective radiant energy responsive means upon tilt of said orientation maintaining means for exerting force on said orientation maintaining means in the direction to restore it gradually to its normal space orientation, said orientation maintaining means comprising a gyroscope, and said supervisory control means comprising means for applying a restoring torque to said gyroscope upon detection of tilt thereof.

3. Stable reference apparatus comprising universally suspended means for maintaining a predetermined orientation in space, and supervisory control means coupled to said orientation maintaining means for exerting correcting influences thereon for gradual change of the orientation thereof with respect to the earth, said supervisory control means comprising directionally selective radiant energy responsive means controlled in position by the position of said orientation maintaining means for receiving radiant energy arriving from the earth's surface, and means responsive to a signal output of said directionally selective radiant energy responsive means upon tilt of said orientation maintaining means for exerting force on said orientation maintaining means in the direction to restore it gradually to its normal space orientation, said directionally selective radiant energy responsive means comprising means for regularly varying the direction of energy reception through a predetermined range of directions relative to said orientation maintaining means to produce regular variations in intensity of the received radiant energy, and said means responsive to the signal output thereof for exerting force on said orientation maintaining means comprising means directly dependent upon the phase of said intensity variations relative to the regular variations of the direction of energy reception for applying force directed according to the phase relation therebetween.

4. Stable reference apparatus as defined in claim 15, wherein said supervisory control means comprises means for receiving infra-red energy arising from the earth and sky, and said predetermined range of directions includes a range of angles of elevation extending through the horizontal direction.

5. Stable reference apparatus as defined in claim 15, further including means for transmitting ultra high frequency radio energy to the earth, said supervisory control means comprising an ultra high frequency radio receiver arranged to receive energy reflected back from the earth's surface.

6. Apparatus for detecting the horizon from a dirigible body, comprising signal-producing radiant energy responsive means, means for periodically varying the direction of reception of said means between a direction above the horizon and a direction below the horizon, and means for differentiating the signal whereby to detect the point in each cycle of such periodic action at which the direction of reception of radiant energy passes through coincidence with a line to the horizon.

7. The apparatus of claim 6, further including motive means, responsive to said differentiated signal, arranged to adjust the radiant energy responsive means in a sense to bring the point of horizon line passage to a predetermined part of the cycle.

8. Stable reference apparatus comprising directionally selective radiant energy receiving means for providing output signals varying according to the variation of average receiving direction inclination of said directionally selective receiving means from a predetermined angle of elevation, said means comprising means for receiving energy along nearly horizontal directions including opposite compass orientations and excluding reception along vertical and steeply inclined directions, and means varying said output signals according to the comparative strengths of energy components received in the opposite compass directional orientations; and motive means responsive to said output signals for regulating the orientation of said receiving means in response to variations of said output signals, said motive means comprising means for suppressing departures of said receiving means from the operating condition corresponding to an average receiving direction inclination coincident with said predetermined angle of elevation.

9. Stable reference apparatus as defined in claim 8, wherein said motive means comprises a gyroscope, and means for jointly regulating the orientations of said gyroscope and said energy receiving means according to variations of said output signals.

10. Stable reference apparatus as defined in claim 8, wherein said motive means comprises a gyrovertical coupled to said receiving means for controlling the orientation thereof, and means coupled to said receiving means and responsive to said output signals for exerting precessional forces on said gyrovertical to suppress variations of said output signals.

11. Stable reference apparatus as defined in claim 8, wherein said directionally selective radiant energy receiving means comprises an infra-red energy responsive transducer for producing signals indicating the amount of infra-red energy impinging thereon, and means for admitting to said transducer infra-red energy arriving along a direction periodically varying in inclination relative to the horizon, whereby the output of said transducer includes distinctive discontinuities corresponding to passage through the horizontal aiming, and the variations of phase of said discontinuities relative to the periodical variation of direction of energy admission are said variations of said output signals according to the variation of average orientation of said directionally selective receiving means.

12. Stable reference apparatus as defined in claim 8, wherein said directionally selective radiant energy receiving means comprises a reflected radio energy receiver, said stable reference apparatus further including means for transmitting radio energy earthward for reflection of energy back to said reflected energy receiver.

13. Stable reference apparatus comprising directionally selective radiant energy means for providing signals representing radiant energy receptions from opposite azimuthal directions, the comparison between the signal values for the opposite azimuthal directions corresponding to difference of inclinations of said azimuthally opposite reception directions, and means differentially responsive to said signals for controlling the reception direction inclinations of said radiant energy means for maintaining the plane of symmetry of said opposite directions vertical.

14. Stable reference apparatus comprising a radio energy transmission and reflected energy reception arrangement including a directive antenna for affording directional selectivity, means for rotating said antenna about an axis transverse the axis of directivity thereof, a gyroscope, means coupling said gyroscope to said antenna for controlling the orientation of the axis of rotation of said antenna in relation to the stable axis established by said gyroscope, said last named means comprising means normally holding the axis of rotation of said antenna vertical whereby said radio transmission and reception arrangement provides detected output signals varying cyclically with the rotation of said antenna when the axis of rotation of said antenna is inclined from the vertical, and means responsive to said cyclical variation of signals for urging said gyroscope toward a vertical-axis orientation, whereby said cyclical variation of said signals is suppressed and said gyroscope axis is accordingly retained substantially vertical.

15. Stable reference apparatus comprising a gyrovertical gimballed for freedom about mutually perpendicular normally horizontal axes, and supervisory control means for exerting precession-producing torque on said gyrovertical when its axis departs from the vertical direction to restore it to vertical, said supervisory control means comprising directionally selective means stabilized by said gyrovertical for receiving and detecting radiant energy arriving from the earth's surface and for providing regular variations in the selective reception direction to produce corresponding variations in intensity of the detected energy, and means for varying the precession-producing torque according to the time phase of the detected energy variations.

16. Stable reference apparatus as defined in claim 15, further including means for transmitting ultra high frequency radio energy to the earth, said supervisory control means comprising an ultra high frequency radio receiver arranged to receive energy reflected back from the earth's surface, and said predetermined range of directions comprising a downward conical locus having its axis parallel to the spin axis of said gyrovertical.

References Cited in the file of this patent

UNITED STATES PATENTS

| | | |
|---|---|---|
| 2,409,448 | Rost | Oct. 15, 1946 |
| 2,424,193 | Rost | July 15, 1947 |
| 2,443,748 | Sanders | June 22, 1948 |
| 2,515,248 | McCoy | July 18, 1950 |